United States Patent
Zhang et al.

(10) Patent No.: US 12,306,032 B2
(45) Date of Patent: May 20, 2025

(54) WEIGHING SYSTEM AND WEIGHING METHOD WITH OBJECT RECOGNITION

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Song Zhang, Changzhou (CN); Shenhui Wang, Changzhou (CN); Shenjian Qian, Changzhou (CN); Jindong Cui, Changzhou (CN); Gang Yang, Changzhou (CN)

(73) Assignees: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 466 days.

(21) Appl. No.: 17/631,088

(22) PCT Filed: Jul. 29, 2020

(86) PCT No.: PCT/CN2020/105366
§ 371 (c)(1),
(2) Date: Jan. 28, 2022

(87) PCT Pub. No.: WO2021/018161
PCT Pub. Date: Feb. 4, 2021

(65) Prior Publication Data
US 2022/0252448 A1 Aug. 11, 2022

(30) Foreign Application Priority Data

Jul. 31, 2019 (CN) .......................... 201910700258.5

(51) Int. Cl.
*G01G 19/414* (2006.01)
*G01G 19/415* (2006.01)

(52) U.S. Cl.
CPC ....... *G01G 19/4144* (2013.01); *G01G 19/415* (2013.01)

(58) Field of Classification Search
CPC .. G01G 19/4144; G01G 19/415; G06V 20/52; G06V 10/22; G06V 20/10;
(Continued)

(56) References Cited

U.S. PATENT DOCUMENTS 5,115,888 A  5/1992  Schneider
6,707,381 B1 * 3/2004  Maloney ................. G07F 9/026
                                                    340/568.1
(Continued)

FOREIGN PATENT DOCUMENTS

CN  203323855    * 12/2013
CN  104296852 A    1/2015
(Continued)

*Primary Examiner* — Jacques M Saint Surin
(74) *Attorney, Agent, or Firm* — Standley Law Group LLP; Jeffrey S. Standley; Adam J. Smith

(57) ABSTRACT

A weighing method comprises the steps of: recognizing one or more objects to be detected on a first scale platform top (A) or within an object recognition area of the first scale platform top (A), and weighing the objects to be detected that are placed on a second scale platform top (B). A weighing system comprises at least two scales having scale platform tops utilizing the weighing method outlined above. The weighing method reduces the difficulty of algorithm recognition by increasing the degree to which the object on the weighting platform fits the algorithm, reduces the com- (Continued)

plexity of operation flow and the time required, and effectively increases the precision and accuracy of object recognition.

16 Claims, 2 Drawing Sheets

(58) Field of Classification Search
CPC ........ G01B 19/62; G01B 11/00; G01N 21/84; G06F 18/241
USPC .......................................................... 177/3
See application file for complete search history.

(56) References Cited

U.S. PATENT DOCUMENTS

| | | | |
|---|---|---|---|
| 9,057,641 B2* | 6/2015 | Amundsen | G06Q 20/208 |
| 9,524,418 B2* | 12/2016 | Velozo | G06V 20/52 |
| 10,290,031 B2* | 5/2019 | Reid | A61B 5/117 |
| 10,502,614 B2* | 12/2019 | Batsikouras | G01G 19/52 |
| 10,699,126 B2* | 6/2020 | Karyodisa | G06V 40/167 |
| 2010/0092035 A1 | 4/2010 | Murdter | |
| 2016/0252390 A1* | 9/2016 | Batsikouras | G01G 23/36 |
| | | | 177/25.13 |
| 2022/0205829 A1* | 6/2022 | Kiyokawa | G01G 19/035 |

FOREIGN PATENT DOCUMENTS

| | | |
|---|---|---|
| CN | 205981415 U | 2/2017 |
| CN | 106618291 A | 5/2017 |
| CN | 107084780 A | 8/2017 |
| CN | 206565858 U | 10/2017 |
| CN | 108303170 A | 7/2018 |
| CN | 108663105 A | 10/2018 |
| CN | 109118200 A | 1/2019 |
| CN | 110009839 A | 7/2019 |
| CN | 110044454 A | 7/2019 |
| EP | 3450934 A1 | 3/2019 |

* cited by examiner

WEIGHING SYSTEM AND WEIGHING METHOD WITH OBJECT RECOGNITION

BACKGROUND OF THE INVENTION

Technical Field

The present invention relates to a weighing system and a weighing method capable of performing object recognition.

Background Art

In the field of weighing, applications such as object counting, check weighing and formulation have a broad market, but due to the complexity of applications, higher requirements have been imposed on weighing techniques. For example, in the formulation or order application, the weighing techniques cannot directly recognize the object category, such that the next operation can be performed only after an object barcode is read by means of an apparatus such as an external scanning gun or the type of an article is manually entered; moreover, for the formulation or order with a large variety of articles, the process becomes more complicated and the operation efficiency is relatively low.

As image recognition techniques evolve rapidly, they find applications in the field of weighing, particularly in areas such as object counting, check weighing, and formulation. For example, with the aid of the image recognition techniques, the article on a weighing platform top can be directly recognized, and the weight of the article is then determined and approved by means of the weighing application, so that the external input step is eliminated, thereby the efficiency is greatly improved.

Particularly, in certain application scenarios where double or multiple scales are required, such as in a double-scale counting system there is provided a high-precision scale body and a medium-precision scale body, since the weight of a single article is small, the weight values of articles are inconsistent, and the difference between individual weight values is large. In a certain practical application scenario, the high-precision scale body is used to weigh a certain number of articles, after the average piece weight is determined based on the number, the articles of the same kind can be continuously placed on the medium-precision scale body, and according to the current weight and the previously calculated average piece weight, the current number of the articles can be directly calculated until a target value is reached. The addition of the image recognition techniques can directly simplify the manual operations of determining article category and counting the number of articles on the high-precision scale body, which substantially increases work efficiency.

The imaging effect of objects in the image and the background algorithm directly determine the precision and accuracy of object recognition. However, in the actual weighing application site, it is possible to encounter more complicated situations. For example, when the objects to be recognized on the weighing platform top are adhered together or a stacking phenomenon occurs, it will pose a challenge to the recognition algorithm. When the weighing area that is expected to be recognized has a poor imaging effect due to external factors such as shadows, strong or weak light, it will also create a challenge to the recognition algorithm. In addition, in order to obtain a more accurate recognition result, it is necessary to consider the final imaging of the object in different postures and at different positions in the field of view during modeling of the object, thus making the modeling process relatively complicated, the requirements for the operator higher, and the time spent also longer.

SUMMARY

The technical problem to be solved by the present invention is the low precision and accuracy of the prior art image recognition when being applied to a weighing apparatus. A new weighing system and a weighing method with an object recognition function are provided, in which the division of labor between different weighing devices is used to optimize the degree to which the image fits the algorithm, effectively improving the precision and accuracy of object recognition.

The present invention solves the above technical problem by providing a weighing method, comprising recognizing one or more objects to be detected that are placed on a first scale platform top or within an object recognition area of the first scale platform top, and weighing the objects to be detected that are placed on a second scale platform top.

In the present invention, an object recognition area is provided on the scale platform top, so that when the object is being recognized, the operation is convenient, and a user only needs to intentionally place the object to be detected in this area for facilitating object recognition. Whereas in the prior art, recognition is performed on the objects placed on the entire platform, and the user needs to place and operate the objects on the platform to ensure that the objects can be recognized. Compared with prior art solutions, the present invention provides object recognition area, which makes it easier for the user to operate the scale and has a higher success ratio of recognition. Moreover, the influence of factors such as object sticking, stacking phenomenon or ambient light source and shadow on object identification and recognition is also avoided when the objects are placed on the entire platform. In turn, the difficulty of algorithm recognition is reduced, and the precision and accuracy of object recognition are effectively increased. At the same time, the operation of image recognition is still simple, faster and efficient, compared with the conventional method that utilizes a scanning gun.

Preferably, the weighing method comprises the steps of acquiring detection results of the objects to be detected that are respectively placed on multiple first scale platform tops or within the object recognition areas thereof; and recognizing the object to be detected based on the detection results.

In the present invention, the same object to be detected is separately detected multiple times, to improve the accuracy of recognition, and in particular, an algorithm such as an existing neural network is further utilized to improve the accuracy of recognition.

In the present invention, by recognizing an object to be detected, it is possible to determine or match information related to an object loaded on the scale platform top, such as item type, article number, size, and weight.

Moreover, in the present invention, scale platforms of two mutually independent scales are used to perform recognition and weighing respectively. Therefore, in the present invention, the object to be detected may be recognized before or after weighing the object to be detected, and may also be recognized simultaneously at the time of weighing the object to be detected.

Preferably, the weighing method comprises the steps of sequentially recognizing different objects to be detected that are placed on the first scale platform top or within the object recognition area of the first scale platform top; and sequentially weighing the different objects to be detected that are placed on the second scale platform top according to a sequence in which the different objects are detected or according to a pre-set sequence. Alternatively, sequentially recognizing the different objects to be detected on each of the first scale platform tops or within the object recognition area thereof; and sequentially weighing the different objects to be detected that are placed on all the second scale platform tops according to a sequence in which the objects are detected or a sequence in which the first scale platform tops or the object recognition areas thereof are arranged.

In the present invention, two scale platform tops are used for division of labor, wherein one is responsible for recognizing the object, and the other one is for weighing the object. The work sequence is asynchronously formed on the two scale platform tops, thereby improving the weighing efficiency. Alternatively, a weighing task is performed in a pre-set sequence, wherein the pre-set sequence may be the priority of the article or an order priority list, etc.

The present invention further utilizes this division of labor, in case of multiple first and second scale platform tops, in accordance with the formed sequence in which the first scale platform tops recognize the objects, all the second scale platform tops are used to complete the weighing task.

Preferably, the weighing method comprises the following steps of sequentially recognizing different objects to be detected that are placed on the first scale platform top or within the object recognition area of the first scale platform top, and recording them into a work sequence; and sequentially weighing the different objects to be detected that are placed on the second scale platform top according to the work sequence.

In the present invention, the work sequence is further formed, for example, by writing the sequence of object recognition in a FIFO sequence, and performing the weighing task by taking the recognition result from the sequence.

Preferably, recognizing the object comprises the steps of: taking a picture including an image of the first scale platform top, or taking a picture of the object recognition area; and recognizing the object to be detected that is present in the picture.

The present invention realizes the visual recognition of the object recognition area in the picture of the entire scale platform top, and can directly utilize and modify the existing visual recognition apparatus to implement the weighing method of the present invention.

In the present invention, it is also possible to directly install a visual recognition apparatus corresponding to an object recognition area, thereby reducing the requirements for apparatus installation.

Preferably, recognizing the object further comprises the step of: weighing the one or more objects to be detected that are placed on the first scale platform top or within the object recognition area.

The present invention realizes the recognition of an object by using both image information and weight information as parameters of object recognition.

Preferably, the weighing method comprises the following step of sending the picture to a training model to recognize the object to be detected that is placed on the first scale platform top; or sending the picture and weight value of the object to be detected on the first scale platform top to the training model to recognize the object to be detected that is placed on the first scale platform top.

The present invention utilizes an existing general training model, in combination with information such as an image of an object to be recognized, to complete the recognition of a particular object.

Preferably, the training model recognizes the object to be detected in the picture by using a picture feature comparison. Alternatively, the training model recognizes the object to be detected in the picture by using the picture feature comparison and whether the deviation between the weight value of the object to be detected and a pre-set standard weight value in the training model is within an error range.

In the present invention, the existing image comparison technique is used to recognize an object to be detected by means of the degree to which the image of the object to be detected in the picture matches an image feature of the object recorded in the model. Moreover, the accuracy of object recognition is further verified by comparing the weight of the object with the standard weight.

Preferably, steps for constructing the training model are as follows: taking pictures of one or more objects placed within the object recognition area on the first scale platform top in different angular directions; and sending the pictures to a recognition algorithm and constructing the pictures into a training model.

Preferably, one or more of weight information of the object, light source information, and shadow information are acquired during or before or after taking the pictures of the object; and the weight information, the light source information, the shadow information, and the pictures taken are sent to the recognition algorithm for constructing the training model.

The present invention further improves the training model by means of environmental information and the weight information of the object, thereby increasing the accuracy of the recognition.

In the present invention, the first scale platform top or the object recognition area may also be used to take pictures of the object in different directions, for example, taking pictures when the object is placed on the scale platform with different standing faces, and the model containing information such as the image of the object and the presented posture is obtained. Since the first scale platform top is independently used as the area and platform top for object recognition, the influence of external factors such as environmental factors is significantly reduced, and the construction of model is simpler and more convenient.

Preferably, the weighing method comprises the following step of outputting the weight value of the object to be detected and the recognized information of the object to be detected, or inputting the weight value of the object to be detected and the recognized information of the object to be detected into an order or a database, or counting objects to be detected by means of the weight value of the object to be detected and outputting the counted number.

In the present invention, the information of the object such as the recognized object type and article number and the total weight of the objects obtained by weighing are pushed to the outside for further use, in particular, inputting into order information or a corresponding database to provide quick and efficient input for subsequent order management, etc.

The present invention also provides a weighing system, comprising at least two scales having scale platform tops, wherein said weighing system utilizes a weighing method described above.

Preferably, the precision of the scale having a first scale platform top is the same as or higher than the precision of the scale having a second scale platform top.

In the present invention, the weight and image recognition of the object are used to improve the accuracy of object recognition, especially when different objects are sensitive to the mass, so one scale needs to take the form of a high-precision scale, and the precision of the another scale does not need to be very high because it only performs weighing of a large number of objects.

Preferably, the scale having the first scale platform top and the scale having the second scale platform top are both provided with an image recognition device, wherein the scale having the first scale platform top is configurable as the scale having the second scale platform top, and the scale having the second scale platform top is configurable as the scale having the first scale platform top.

Preferably, the weighing system comprises one or a number of scales having the first scale platform top and multiple scales having the second scale platform top.

In the present invention, it is possible to provide more scales having the second scale platform top than the scale having the first scale platform top to increase the weighing efficiency and to reduce the requirements such as weighing capacity of the scale having the second scale platform top.

All the scales of the present invention may be used for image recognition, and thus the functions in the present invention can be interchanged. In particular, when the precision of the scale having the first scale platform top is degraded, the scale having the second scale platform top can be switched to perform image recognition, and object recognition and weighing can be continued.

The positive and progressive effects of the present invention are as follows: the present invention reduces the difficulty of algorithm recognition by increasing the degree to which the object on the weighing platform fits the algorithm, reduces the complexity of the operation flow and the required time, and effectively increases the precision and accuracy of the object recognition.

DETAILED DESCRIPTION OF EMBODIMENTS

The present invention is further illustrated below by way of embodiments, but is not thus limited within the scope of the embodiments.

A weighing system of the present invention comprises two or more scales, wherein one or more of the scales are selected as the scale for object recognition, and the objects are recognized by means of image recognition. All the objects on scale platforms of the other scales are then weighed, and the weighing data and object recognition results can be used to further count the objects and perform other such functions that are relevant in the context of retailing and industrial weighing. In addition, the processing of formulation or order information can be realized by combining article information related to the object.

By way of the embodiments as described below, the implementations of the present invention are illustrated by way of examples.

Figure 1:
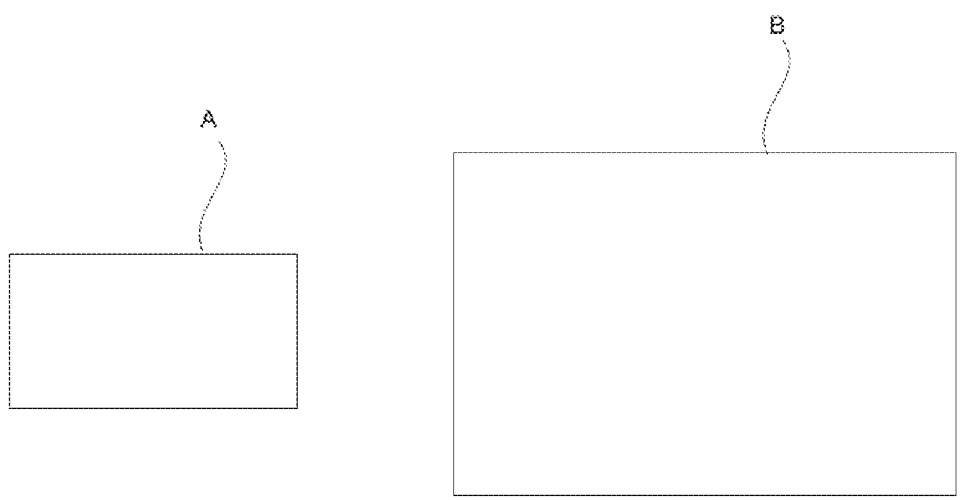
FIG. 1 is a schematic view of a scale platform top of a platform scale in a weighing system according to an embodiment of the present invention.

A weighing system comprising two platform scales in an embodiment is shown in FIG. 1, wherein a field of view of a camera on one high-precision platform scale A covers the entire scale platform of the scale, and in this embodiment image recognition is performed only on an object placed on the platform scale A of the weighing system. The other platform scale B is a platform scale with a low precision and is only used for weighing objects.

In another embodiment, a partial area of the platform scale A is selected that is covered by the field of view of the camera and serves as an object recognition area.

When performing object recognition, either one object or multiple objects, for example, three or six objects, may be placed on the platform scale A. The camera takes a picture of the scale platform top of the platform scale A, and the weight weight_a of the object is weighed on the platform scale A and the weight data is saved.

The background algorithm recognizes the object(s) placed on the weighing platform top of the platform scale A by means of the picture, extracts image features and compares the extracted image features with a previously stored training model to establish a relationship. The background algorithm gives an object matching confidence, and then compares the weight information weight_a with weight information weight_a_s recorded in the model within a pre-set certain tolerance. The confidence and the weight tolerance are combined with the object recognition result to make a comprehensive determination.

Then, an unlimited number of objects can be placed on or dumped to the platform scale B. In this embodiment, the object recognition is performed only on the platform scale A, so that there is no requirement for the placement of objects on the platform scale B compared to the prior art, which is convenient for the operator to use and operate.

Thereafter, the weight weight_ab on the entire platform top is weighed, and the weight data weight_a and weight_ab is sent to the background algorithm for processing.

When the background algorithm determines that the object on the weighing platform top of the platform scale A is the desired object, the object information and the weight information weight_ab can be directly output or recorded. It is also possible to send the weight data weight_ab on the entire platform top to an order to record the total weight of the objects in the order, and to calculate the number of the objects of this type by the relationship between the total weight and the piece weight (e.g., weight_a_s), and the quantity information is also sent to the order for storage. It is also possible to count the objects. After the number reaches the number indicated in the order, the relevant information is inputted into the order, and the platform scale of the weighing system proceeds to the processing of objects of the next type or waits for the next operation.

In another embodiment, the platform scale B has the same configuration as the platform scale A, and is also a high-precision scale equipped with a camera for image recognition. In this embodiment, the weighing system still uses one of the platform scales for object recognition and the other for performing object weighing, but the functions of the platform scale A and the platform scale B in the weighing system are interchangeable.

In another embodiment, the weighing system further comprises three platform scales identical to the platform scale B. These four platform scales B may be platform scales with a low precision. Weighing by multiple platform scales B can improve the rate of weighting or counting. In addition, by increasing the number of the platform scales B, the rate of weighing or counting can be further increased. At the same time, in case of same target weighing capacity or quantity, the mode with multiple platform scales B has reduced requirements for the weighing capacity of the single platform scale, so that the configuration of the platform scale in the weighing system is more diverse.

In still another embodiment, while object recognition is performed on the platform scale A, the platform scale B weighs the object(s) placed or dumped thereon. In addition, the platform scale B may first weigh the object placed or dumped thereon. The object to be recognized is then placed on the platform scale A, and the object is recognised by means of image recognition.

In a variant example, after the platform scale A completes recognition, and before the platform scale B completes the weighing and counting of the object, another object can be placed on the platform scale A for recognition. The process also includes waiting for the platform scale B to complete the current weighing task, and then the platform scale B performs the weighing task for the next object.

In another variant example, the platform scale A sequentially recognizes the different objects placed on the platform and generates a weighing task queue. The platform scale B sequentially completes the weighing tasks according to the weighing task queue, and records them as individual orders one time.

To further reduce the difficulty of feature extraction and comparison of the algorithm, in another embodiment, the training model is also established by utilizing the platform scale A. In the model establishment, at first, one object, or multiple objects such as seven or twelve objects, is/are placed on the weighing platform top of the platform scale A in a specified posture(s) and position (s). Exemplary posture(s) and position(s) of the object(s) such as a part with three standing faces, only one standing face may be selected, a part is placed in the center of the weighing platform top with its orientation being perpendicular to the position of the weighing platform top. A picture is then taken and the taken picture is sent to the recognition algorithm for model training. Finally, the model is obtained, which contains information such as the object image and the presented posture.

In another embodiment, while a picture of the object is taken, the object is also weighed, and the weight information weight_a_s of the object is obtained and sent to the recognition algorithm for model training.

In still another embodiment, the environment information such as the light source and the shadow during the entire process of taking the picture or before or when taking the picture of the object is also sent to the recognition algorithm for model training.

Figure 2:
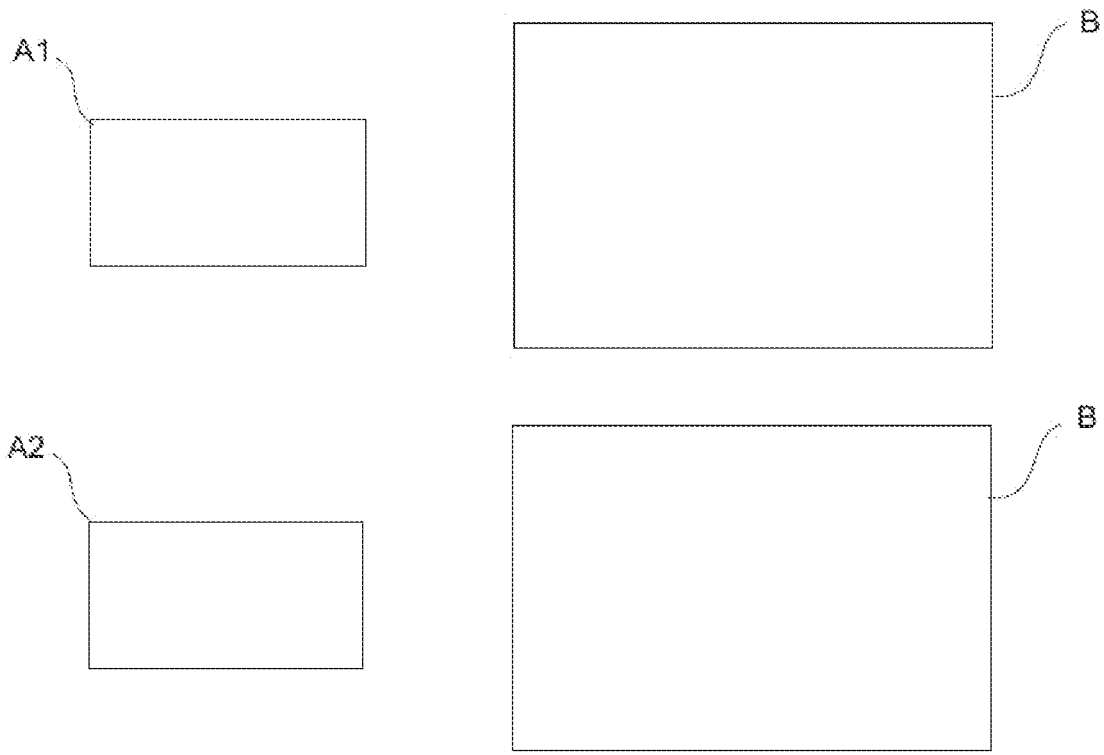
FIG. 2 is a schematic view of a scale platform top of a platform scale in a weighing system according to another embodiment of the present invention.

In the embodiment shown in FIG. 2, the weighing system comprises two high-precision platform scales A1 and A2, and two platform scales B. The platform scales B have the same configuration as the platform scale B of the embodiment shown in FIG. 1. The platform scales A1 and A2 have the same configuration as the platform scale A in the embodiment shown in FIG. 1.

In this embodiment, the two platform scales A1 and A2 are both used to recognize the carried object, and in this embodiment, the recognition results of the two platform scales are integrated, and the final object recognition result is thus obtained. When, in a variant example of the embodiment, more platform scales having the same configuration as the platform scale A1 or the platform scale A2 are added to improve the recognition result, some existing calculation models or neural networks can be used to further improve the correct ratio of recognition results.

The two platform scales B respectively weigh the objects carried thereon, increasing the rate of weighing or counting.

In another embodiment, the platform scales A1 and A2 respectively recognize different objects, and the two platform scales B only perform weighing or counting of one type of objects, and after completion, perform weighing or counting of another type of objects. For example, for the platform scale B, the weighing and counting of two different types of objects are performed according to the priority levels of the two types of objects set in advance, or the weighing and counting are performed according to the sequence in which the objects are recognized. In this embodiment, two platform scales are used to quickly switch the weighing or counting of different objects, e.g., when the object recognized on the platform scale A1 is weighed on the platform scale B, the platform scale A2 detects the next object to be recognized, and the platform scale B can immediately switch to the weighing of the next object when it completes the weighing of the previous object. By switching the platform scale B to weigh the different objects recognized by the platform scales A1 and A2, the weighing sequence can be determined for different orders.

Compared with the method of the embodiment of FIG. 1, the platform scale A1 corresponds to one platform scale B, and the platform scale A2 corresponds to one platform scale B, so that the weighing system of this embodiment has a higher efficiency.

In still another variant example, the platform scale A3 and the platform scale A4 configured in the same manner as the platform scale A1 are also provided, so that four different types of objects can be simultaneously processed. Therefore, based on the number of the objects that need to be processed, more platform scales A can be provided.

Although the specific implementations of the present invention are described above, a person skilled in the art should understand that these are only exemplary, and the scope of protection of the present invention is defined by the attached claims. A person skilled in the art can make various changes or modifications to these implementations without departing from the principle and spirit of the present invention, but all the changes or modifications fall within the scope of protection of the present invention.

REFERENCE SIGNS LIST

A, A1, A2 high-precision platform scale
B low-precision platform scale
The invention claimed is:
1. A method of weighing one or more objects, comprising the steps of:
recognizing, on a weighing platform of a first scale or within an object recognition area of the weighing platform, at least one of the one or more objects; and
weighing, on a weighing platform of a second scale, a set of the one or more objects;
wherein:
at least one first object and at least one second object, different from the first object (collectively, the "different objects"), are recognized sequentially in the recognizing step;
the different objects are sequentially recognized on the weighing platform of the first scale or within the object recognition area of the weighing platform, and
a set of the first objects and a set of the second objects are weighed sequentially in the weighing step, either according to a sequence in which the different objects are recognized or according to a pre-set sequence; or the different objects are sequentially recognized on weighing platforms of different first scales or within object recognition areas of the weighing platforms, and sequentially weighing sets of the different objects in the weighing step either according to a sequence in which the different objects are recognized or according to a sequence in which the first scale weighing platforms or the object recognition areas thereof are arranged.

2. The weighing method of claim 1 wherein more than one object are recognized in the step of recognizing at least one of the one or more objects, said method comprising the further steps of:

acquiring detection results of the more than one object that are respectively placed on multiple weighing platforms, including the weighing platform, of the first scale or within the object recognition areas thereof; and using the detection results for recognizing the more than one object.

3. The weighing method of claim 1, further comprising the steps of:

sequentially recognizing the different objects on the weighing platform of the first scale or within the object recognition area of the weighing platform;

recording them into a work sequence; and sequentially weighing sets of the different objects in the weighing step according to the work sequence.

4. The weighing method of claim 1, wherein the step of recognizing the at least one of the one or more objects comprises the sub-steps of:

taking a picture including an image of the weighing platform of the first scale, or taking a picture of the object recognition area of the first scale; and using the picture to recognize the at least one of the one or more objects in the picture.

5. The weighing method of claim 4, wherein the step of recognizing the at least one of the one or more objects further comprises a sub-step of:

weighing the at least one of the one or more objects that are placed on the first scale.

6. The weighing method of claim 5, wherein the recognizing step comprises a sub-step of:

sending the picture to a trained model to recognize the at least one of the one or more objects; or sending both the picture and a weight value of the at least one of the one or more objects to the trained model.

7. The weighing method of claim 6, wherein:

the trained model is configured to recognize the at least one of the one or more objects in the picture by using a picture feature comparison; or the trained model is configured to recognize the at least one of the one or more objects in the picture by using the picture feature comparison and whether a deviation between the weight value of the at least one of the one or more objects and a pre-set standard weight value in the trained model is within an error range.

8. The weighing method of claim 7, wherein the trained model is constructed by the steps of:

taking pictures of at least one of the one or more objects placed within the object recognition area on the first scale in different angular directions; and sending the pictures to a recognition algorithm for constructing the pictures into a trained model.

9. The weighing method of claim 8, wherein the pictures taken and at least one of the following is sent to the recognition algorithm for constructing the trained model:

weight information of the at least one of the one or more objects, light source information, shadow information.

10. The weighing method of claim 1, further comprising the steps of:

outputting a weight value of the set of the one or more objects and the recognized information of the at least one of the one or more objects; or inputting the weight value of the set of the one or more objects and the recognized information of the at least one of the one or more objects into an order or a database, or outputting a counted number for the set of the one or more objects after counting the objects of the set of the one or more objects by means of a weight value determined in the step of weighing the set of the one or more objects.

11. A weighing system, comprising at least one first scale and at least one second scale, each having a weighing platform, wherein the weighing system is configured to perform the method steps of claim 1.

12. The weighing system of claim 11, wherein:

each first scale in the weighing system has a precision that is the same as or higher than a precision of each second scale in the weighing system.

13. The weighing system of claim 11, wherein:

each first scale and each second scale are provided with an image recognition device; and each first scale is operatively configurable as a second scale, and vice versa.

14. The weighing method of claim 1, wherein:

the set of the one or more objects comprises the at least one of the one or more objects.

15. The weighing method of claim 1, wherein:

the set of the one or more objects has a different composition from the at least one of the one or more objects.

16. The weighing method of claim 1, wherein:

the set of the one or more objects consists of a single object.

* * * * *